(12) United States Patent
Nowak et al.

(10) Patent No.: US 6,257,616 B1
(45) Date of Patent: Jul. 10, 2001

(54) HEADLINER ASSEMBLY

(75) Inventors: Raymond J. Nowak; Jonathan Peter Cansfield; Robert C. Fitzpatrick; Alan P. Collins, all of Holland, MI (US)

(73) Assignee: Prince Technology Corporation, Holland, MI (US)

( * ) Notice: Subject to any disclaimer, the term of this patent is extended or adjusted under 35 U.S.C. 154(b) by 0 days.

(21) Appl. No.: 09/219,010

(22) Filed: Dec. 23, 1998

(51) Int. Cl.[7] ................................... B60R 21/22
(52) U.S. Cl. ........................ 280/730.2; 296/214
(58) Field of Search ............... 280/730.2, 730.1, 280/728.2; 296/214

(56) References Cited

U.S. PATENT DOCUMENTS

| | | | |
|---|---|---|---|
| 5,265,903 | * | 11/1993 | Kuretake et al. ............... 280/730.2 |
| 5,540,459 | * | 7/1996 | Daniel ............................... 280/730.2 |
| 5,755,457 | | 5/1998 | Specht . |
| 5,791,683 | * | 8/1998 | Shibata et al. ................... 280/730.2 |
| 5,823,611 | | 10/1998 | Daniel et al. . |
| 5,921,575 | * | 7/1999 | Kretschmer et al. ............ 280/728.2 |
| 6,070,902 | * | 6/2000 | Kowalski et al. ................ 280/730.2 |
| 6,079,732 | * | 6/2000 | Nakajima et al. ............... 280/728.2 |
| 6,082,761 | * | 7/2000 | Kato et al. ........................ 280/730.2 |
| 6,129,377 | * | 10/2000 | Okumura et al. ................ 280/730.2 |
| 6,135,491 | * | 10/2000 | Olson et al. ...................... 280/730.2 |
| 6,142,506 | * | 11/2000 | Patel et al. ........................ 280/728.2 |
| 6,142,509 | * | 11/2000 | White et al. ...................... 280/730.2 |

FOREIGN PATENT DOCUMENTS

| | | |
|---|---|---|
| 29716574 | 1/1998 | (DE) . |
| 841 221 | * 5/1998 | (EP) . |
| 2 784 647 | 4/2000 | (FR) . |
| 1038859 | 5/1998 | (JP) . |
| 10-315896 | * 12/1998 | (JP) . |
| WO 97/35747 | 10/1997 | (WO) . |

* cited by examiner

*Primary Examiner*—Paul N. Dickson
(74) *Attorney, Agent, or Firm*—Foley & Lardner

(57) ABSTRACT

A headliner assembly for use in a vehicle including a headliner having a panel, an airbag carrier bracket coupled to the panel of the headliner, an airbag inflater coupled to the airbag carrier bracket, and a side curtain airbag coupled to the airbag carrier bracket and the airbag inflater, for inflation during a collision.

21 Claims, 3 Drawing Sheets

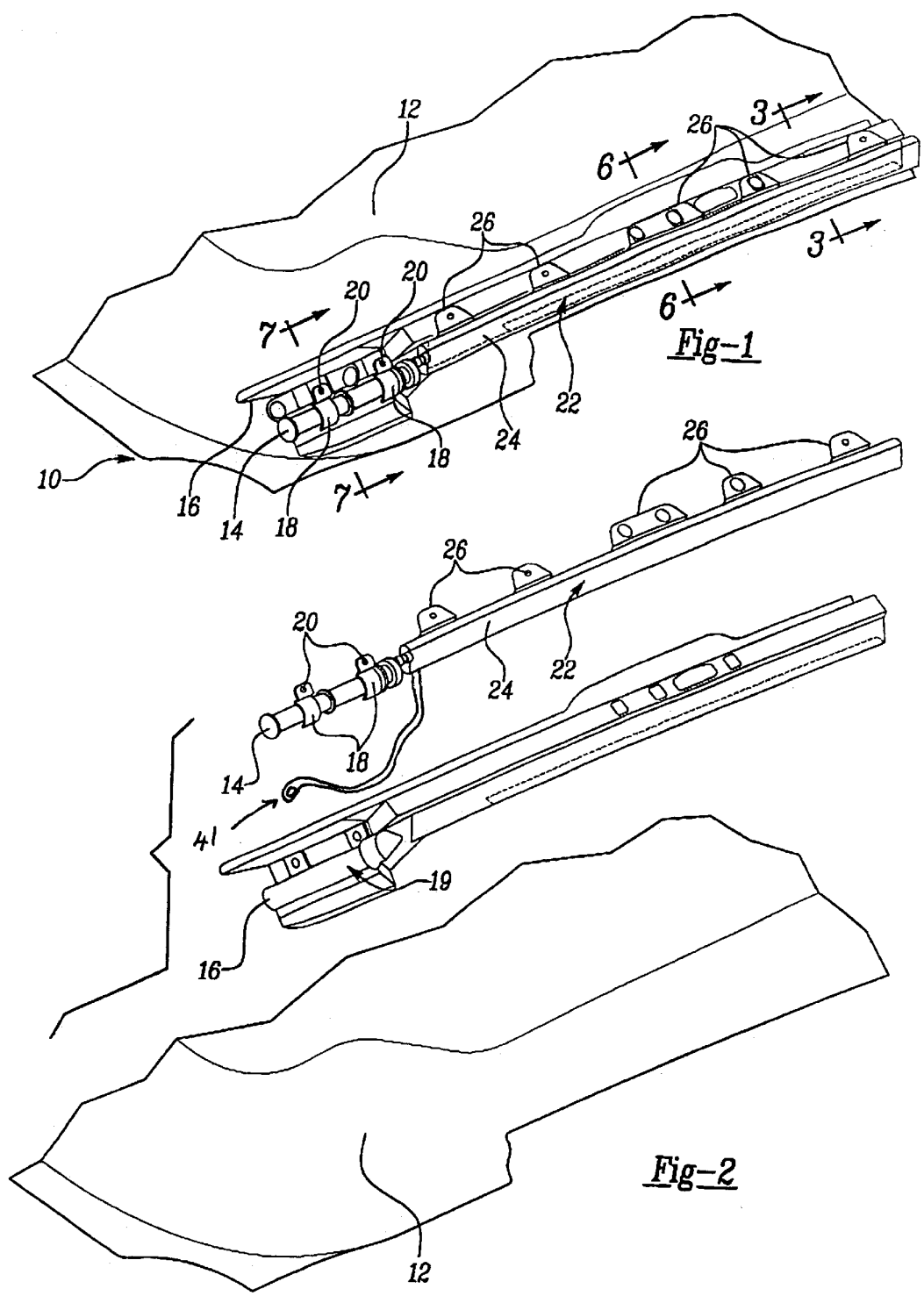

HEADLINER ASSEMBLY

BACKGROUND OF THE INVENTION

The present invention relates to a headliner. More specifically, the present invention relates to an airbag carrier bracket for a headliner.

The development and improvement of side impact protection, including side curtain airbags, has been of continuing priority in the automotive industry. One method of providing side impact protection, is to deploy a side curtain airbag in a downward fashion from a vehicle roof along the vehicle side walls.

SUMMARY OF THE INVENTION

The present invention provides a preassembled, modular side curtain airbag assembly mounted to a vehicle headliner to simplify the installation of the side curtain airbag in a vehicle.

To achieve this object, the invention includes an airbag, airbag inflater, and airbag carrier bracket which is mounted to a panel of a headliner which generally covers the interior roof of a vehicle. In the preferred embodiment of the present invention, the airbag and airbag inflater are mounted to the airbag carrier bracket which is coupled to the panel of the headliner and the airbag. By integrating the side curtain airbag assembly with the headliner, the installation of the side curtain airbag assembly into a vehicle will be simplified. Presently, the installation of a side curtain airbag assembly includes the intermediate step of installing the side curtain airbag to the frame of a vehicle and then installing the headliner. A headliner that includes an integral side curtain airbag assembly will eliminate the intermediate step of mounting the side curtain airbag to the frame of the vehicle, leading to a more efficient assembly of the interior components of a vehicle.

A further advantage of the present invention is increased energy absorption in the headliner of the vehicle. A layer of foam may be placed in recesses or voids created by the corrugated shape of the airbag carrier bracket and underlying the headliner to create an energy absorption zone for an impact with the interior roof of the vehicle. The airbag assembly bracket may be configured to be generally rigid in normal operating conditions but still be capable of flexure to absorb energy during a collision.

The side curtain airbag assembly will deploy along either interior side of a vehicle, covering generally the side windows and the B, C, and/or D pillars upon triggering by a collision sensor.

BRIEF DESCRIPTION OF THE DRAWINGS

FIG. 1 is a partial perspective view of the headliner and side curtain airbag assembly;

FIG. 2 is an exploded partial perspective view of the headliner and side curtain airbag assembly;

DETAILED DESCRIPTION OF THE PREFERRED EMBODIMENT

Figure 3:
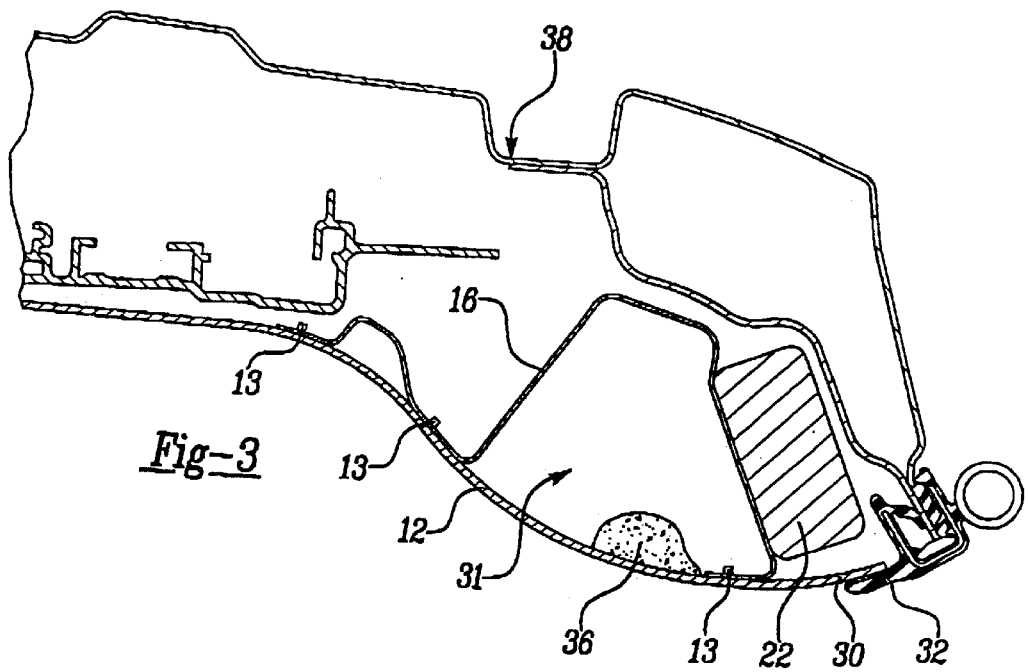
FIG. 3 is a general cross section of the present invention taken along line 3—3 in FIG. 1.

The following description of the present invention is merely exemplary in nature and is in no way intended to limit the invention or its uses. Moreover, the following description, while depicting a side curtain airbag assembly, is intended to adequately teach one skilled in the art to make and use airbags for a variety of impacts including, but not limited to, frontal impacts.

FIGS. 1 and 2 are partial perspective views of the side curtain airbag assembly 10 of the present invention mounted to a panel 12 of a headliner. The side curtain airbag assembly 10 includes an airbag inflater 14 coupled to an airbag carrier bracket 16, running longitudinally along the panel 12, by a plurality of coupling brackets 18. The coupling brackets 18 are curved in a semicircular manner so that they may better mate with the circular surface of the airbag inflater 14. The surface of the coupling brackets 18 engage the surface of the airbag carrier bracket 16, and the coupling brackets 18 are connected to the airbag carrier bracket 16 through flanges 20 using mechanical fasteners or adhesives. The airbag inflater 14 in its mounted position will reside in a recess 19 which has been formed in the airbag carrier bracket 16 to approximate the form of the airbag inflater 14.

Referring to FIGS. 1 and 2, a side curtain airbag 22 is shown coupled to the airbag inflater 14 and airbag carrier bracket 16. The side curtain airbag 22 in an undeployed or folded state is enclosed by a canister 24 to protect the side curtain airbag 22 and give it an anchoring point. The canister 24 may be made from a plastic such as polyethylene and is equipped with a seam to allow the downward deployment of the side curtain air bag 22. A plurality of flanges 26 are coupled to the canister 24 and provide the engagement points to which the side curtain airbag 22 is mounted to the airbag carrier bracket 16. The flanges 26 engage with the airbag carrier bracket 16 using adhesives or mechanical fasteners such as z-axis clips. In an alternate embodiment the side curtain air bag 22 is contained in a flexible bag and anchored to the airbag carrier bracket 16 with cloth strips. The side curtain airbag 22 and airbag inflater 14 may be coupled with a gas conduction pipe.

The airbag carrier bracket 16 may be comprised of numerous materials including stiff and/or flexible materials, including, but not limited to, sheet metal, plastics, composites, and molded fiberboard. The airbag carrier bracket 16 has been formed to fit the contour of the panel 12 when mounted to the panel 12 to lessen its space requirements and is corrugated to include recesses and voids. The airbag carrier bracket 16 is mounted to the panel 12 using mechanical fasteners 13 and/or adhesives. In the preferred embodiment, a hot melt adhesive is used to mount the air bag carrier bracket 16 to the panel 12 of the headliner. The advantages of this assembly include unitary packaging and fewer assembly steps in affixing the headliner and the side curtain air bag 22 to a vehicle roof. The multiple steps of mounting the headliner and mounting the side curtain airbag 22 are now reduced to a single operation of mounting the headliner, simplifying the installation of the side curtain airbag 22. Additional advantages include supplementary support and energy absorption created by the airbag carrier bracket 16.

Figure 4:
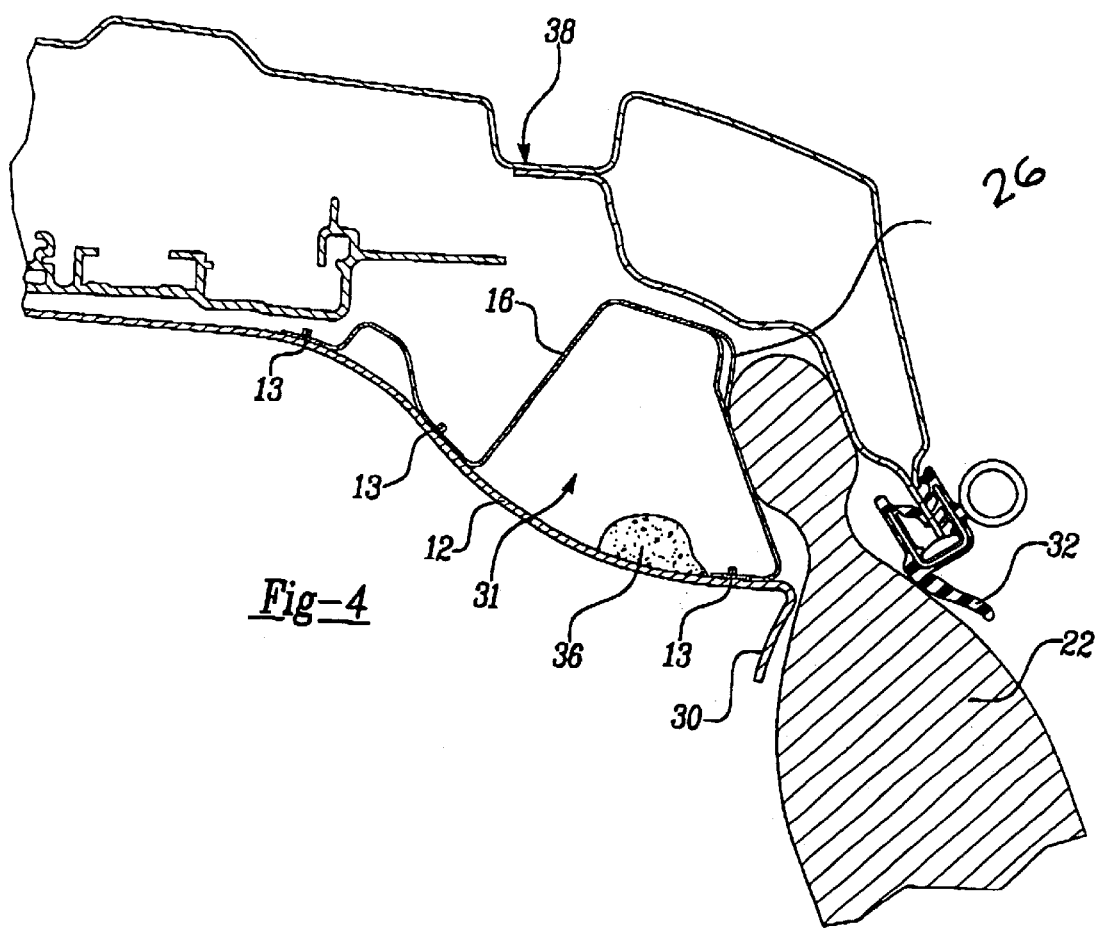
FIG. 4 is a general cross section of the present invention taken along line 3—3 in FIG. 1 illustrating a deployed side curtain airbag.

FIGS. 3–7 illustrate various cross sections taken at different locations in the present invention. FIG. 3 is a general cross section taken along line 3—3 in FIG. 1 of the assembly showing the side curtain airbag 22 in an undeployed state. The airbag carrier bracket 16 is shown coupled to the panel 12 beneath a vehicle roof 38. The side curtain airbag 22 is coupled to the airbag carrier bracket 16 proximate the side of the vehicle and overlying an exterior edge 30 of the panel 12 which underlies a gimp strip or weather strip seal 32. The airbag carrier bracket 16 includes a recess or depression 31 created by the corrugations of the airbag carrier bracket 16. An energy absorbent material 36 such as a structural foam article or layer may be added between the panel 12 and the airbag carrier bracket 16 in the depression 31 to aid in the absorption of energy during an impact with the vehicle roof 38. FIG. 4 is a sectional view taken along line 3—3 of FIG. 1 and illustrates the side curtain airbag 22 after deployment. The edge 30 of the panel 12 and the gimp strip 32 have been deflected to allow the deployment of the side curtain airbag 22 into the vehicle cabin. The side curtain airbag 22 is deployed when triggered by a vehicle collision sensor which is well known in the art. The airbag inflater 14 will generate gas into one end of the side curtain airbag 22 and the gas will quickly propagate to the opposite end of the side curtain airbag 22 to fully inflate the side curtain airbag 22. A tether 41 couples an end of the side curtain airbag 22 to the airbag carrier bracket 16 so that the side curtain airbag 22 will have an anchoring point to maintains its orientation during deployment and a collision. A second tether (not shown) is coupled at the opposite end of the side curtain air bag 22 and serves the identical function.

Figure 5:
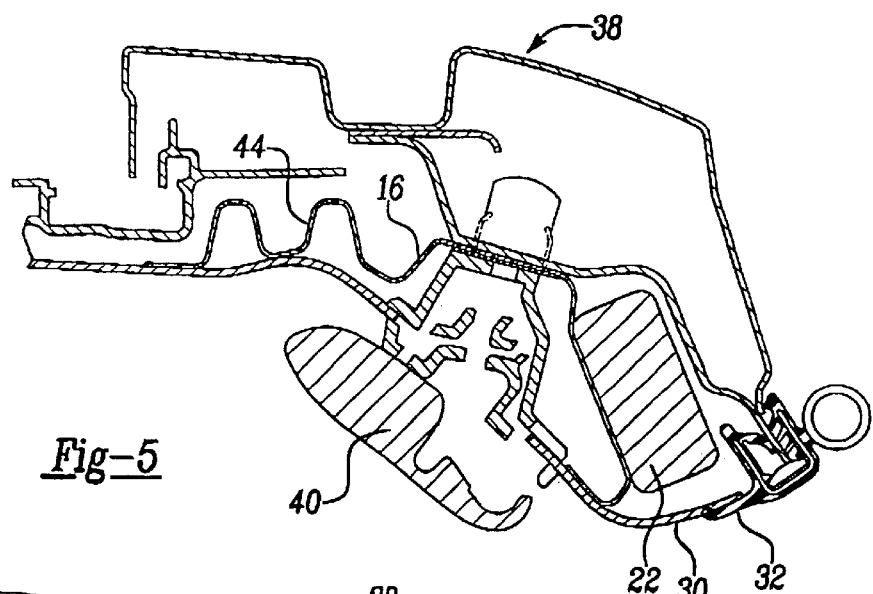
FIG. 5 is a cross section taken along a front grab handle in a vehicle.
Figure 6:
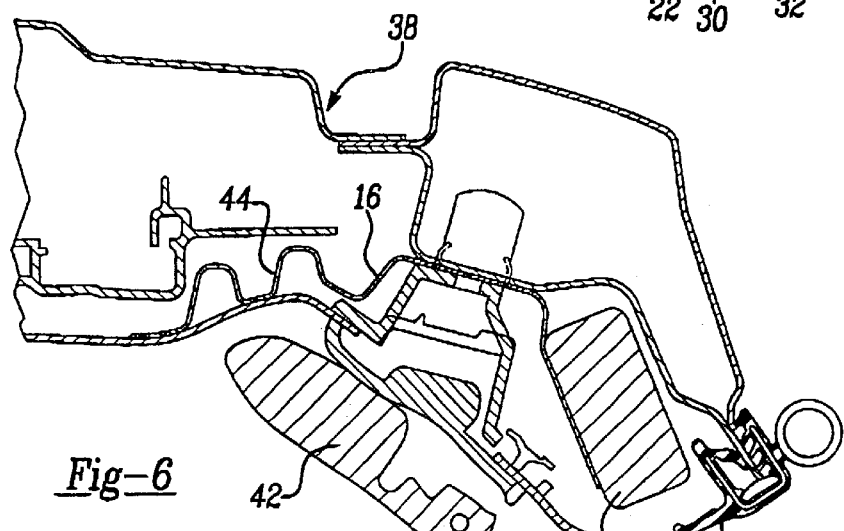
FIG. 6 is a cross section taken along the rear grab handle and line 6—6 in FIG. 1.

FIG. 5 is a cross section taken along a front grab handle 40 and FIG. 6 is a cross section taken along a rear grab handle 42 and line 6—6 in FIG. 1.

Figure 7:
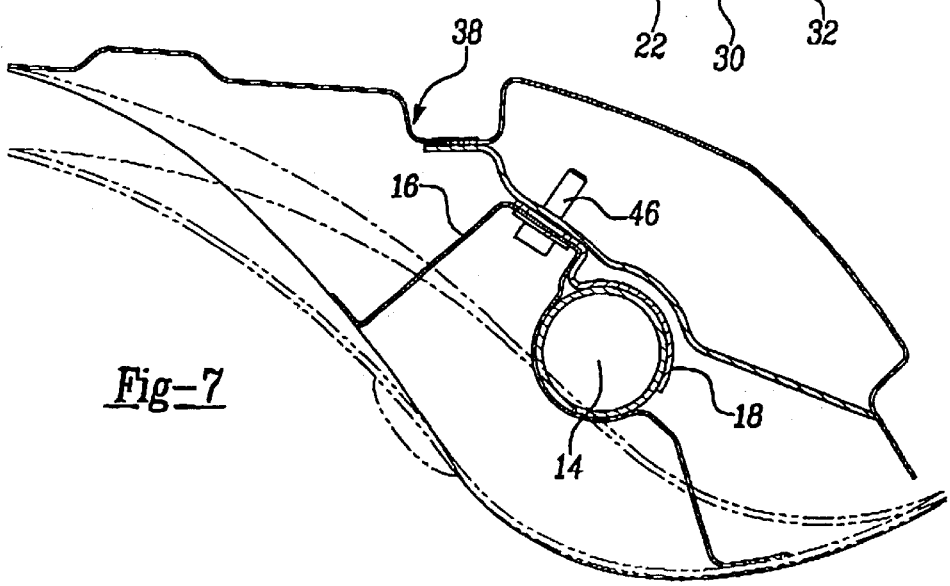
FIG. 7 is a cross section of the present invention taken along line 7—7 in FIG. 1.

FIG. 7 is a cross section of the assembly taken along line 7—7 in FIG. 1. The airbag inflater 14 is shown coupled to the airbag carrier bracket 16 by the coupling bracket 18. In this embodiment of the present inventional mechanical fastener 46 is shown engaging the coupling bracket 18 and the airbag carrier bracket 16, sandwiching the airbag inflater 14 between the coupling bracket 18 and the airbag carrier bracket 16.

It is to be understood that the invention is not limited to the exact construction illustrated and described above, but that various changes and modifications may be made without departing from the spirit and scope of the inventions as defined in the following claims.

What is claimed is:

1. A headliner assembly for use in a vehicle comprising:
   a headliner having a panel;
   an airbag carrier bracket coupled to said panel of said headliner;
   an airbag inflater coupled to said airbag carrier bracket; and
   a side curtain airbag covered at least partially by said panel and coupled to said airbag carrier bracket and said airbag inflater for inflation during a collision.

2. The headliner assembly of claim 1, wherein said airbag carrier bracket is solely coupled to said panel.

3. The headliner assembly of claim 1, wherein said airbag carrier bracket is adhesively coupled to said panel.

4. The headliner assembly of claim 1, wherein said airbag carrier bracket is coupled to said panel using fasteners.

5. The headliner assembly of claim 1, wherein said airbag carrier bracket is made of a material selected from the group consisting of: steel, aluminum, plastic, molded fiberboard, and composite materials.

6. The headliner assembly of claim 1, further comprising a weather strip seal wherein said weather strip seal partially covers said side curtain airbag and borders said panel at the exterior end of the said panel, said weather strip seal and said panel being deflected by the deployment of said side curtain airbag.

7. The headliner assembly of claim 1, further comprising a gas conduction pipe linking said airbag inflater and said side curtain airbag.

8. The headliner assembly of claim 1, wherein said side curtain airbag deploys in a linear fashion along an interior side of said vehicle, said side curtain airbag beginning its inflation on the end of said side curtain airbag proximate to said airbag inflater and continuing to the opposing end of said side curtain airbag.

9. The headliner assembly of claim 1, wherein said side curtain airbag is attached by a tether to said airbag carrier bracket at one end.

10. The headliner assembly of claim 1, further comprising an energy absorbent material located between said airbag carrier bracket and said panel to create a cushioned zone for impact on a roof of said vehicle.

11. The headliner assembly of claim 1, wherein said air bag carrier bracket is corrugated to included recesses.

12. The headliner assembly of claim 11, wherein said recesses are filled with an energy absorbent material.

13. The headliner assembly of claim 12, wherein said energy absorbent material is a semi-rigid structural foam.

14. A headliner assembly for a vehicle having an interior roof, roof pillars, and side windows, comprising:
   a panel for generally covering said interior roof of said vehicle;
   a corrugated airbag carrier bracket exclusively coupled to said panel; and
   an airbag assembly including an airbag and airbag inflater coupled to said airbag carrier bracket.

15. The headliner assembly of claim 14, wherein said corrugated airbag carrier bracket is coupled to said panel using an adhesive.

16. The headliner assembly of claim 15, wherein said adhesive is a hot melt adhesive.

17. The headliner assembly of claim 14, wherein said corrugated airbag carrier bracket is coupled to said panel using fasteners.

18. The headliner assembly of claim 17, wherein said fasteners are z-axis clips.

19. The headliner assembly of claim 14, wherein said corrugated airbag carrier bracket is made of a material selected from the group consisting of: steel, aluminum, plastic, molded fiberboard, and composite materials.

20. The headliner assembly of claim 14, wherein said panel is bordered by a gimp strip proximate to said airbag, said gimp strip and said panel being deflected by the deployment of said airbag.

21. A headliner assembly for a vehicle having an interior roof, roof pillars, and side windows, comprising:
   a panel for generally covering said interior roof of said vehicle;
   a corrugated airbag carrier bracket exclusively coupled to said panel;
   an airbag assembly including an airbag and airbag inflater coupled to said airbag carrier bracket;
   a weather strip seal proximate to said airbag; and
   an airbag assembly cover comprised of a portion of said panel and said weather strip seal, wherein said weather strip seal and said panel being deflected by the deployment of said airbag.

* * * * *